(12) United States Patent
Gross et al.

(10) Patent No.: US 6,507,341 B1
(45) Date of Patent: Jan. 14, 2003

(54) METHOD AND APPARATUS IN A DATA PROCESSING SYSTEM FOR ACCELERATED BACK-FACE CULLING USING LOOK-UP TABLES

(75) Inventors: Lee Michael Gross, Austin, TX (US); Andrew Kent Taylor, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 271 days.

(21) Appl. No.: 09/611,370

(22) Filed: Jul. 6, 2000

(51) Int. Cl.[7] .............................................. G06T 17/00
(52) U.S. Cl. ...................................................... 345/421
(58) Field of Search ................................ 345/419, 420, 345/421, 422, 423, 424

(56) References Cited

U.S. PATENT DOCUMENTS 5,898,437 A * 4/1999 DEolaliker .................. 345/421

* cited by examiner

Primary Examiner—Cliff N. Vo
(74) Attorney, Agent, or Firm—Duke W. Yee; Robert M. Carwell

(57) ABSTRACT

A method and apparatus in a data processing system for generating a two dimensional display of a three dimensional object. Data is received representing the three dimensional object. Back-face culling is performed using a data structure, wherein the data structure includes a set of predetermined visibility data derived from the results of dot products of normal vectors with eye vectors. The two dimensional display of the three dimensional object is generated using results of the back-face culling.

30 Claims, 5 Drawing Sheets

| Interval | Index Value | φ Angle (Degrees) |
|---|---|---|
| 0 | 0 | 0 |
| 1 | 32 | 5.8 |
| 2 | 64 | 11.6 |
| 3 | 96 | 17.4 |
| 4 | 128 | 23.2 |
| 5 | 160 | 29 |
| 6 | 192 | 34.8 |
| 7 | 224 | 40.6 |
| 8 | 256 | 46.5 |
| 9 | 288 | 52.3 |
| 10 | 320 | 58 |
| 11 | 352 | 63.9 |
| 12 | 384 | 69.7 |
| 13 | 416 | 75.5 |
| 14 | 448 | 81.3 |
| 15 | 480 | 87.1 |
| 16 | 512 | 92.9 |
| 17 | 544 | 98.7 |
| 18 | 576 | 104.5 |
| 19 | 608 | 110.3 |
| 20 | 640 | 116.1 |
| 21 | 672 | 121.9 |
| 22 | 704 | 127.7 |
| 23 | 736 | 133.5 |
| 24 | 768 | 139.4 |
| 25 | 800 | 145.2 |
| 26 | 832 | 151 |
| 27 | 864 | 156.8 |
| 28 | 896 | 162.6 |
| 29 | 928 | 168.4 |
| 30 | 960 | 174.2 |
| 31 | 992 | 180 |

| Interval / Index Value | θ Angle (Degrees) |
|---|---|
| 0 | 0 |
| 1 | 11.6 |
| 2 | 23.2 |
| 3 | 34.8 |
| 4 | 46.5 |
| 5 | 58 |
| 6 | 69.7 |
| 7 | 81.3 |
| 8 | 92.9 |
| 9 | 104.5 |
| 10 | 116.1 |
| 11 | 127.7 |
| 12 | 139.4 |
| 13 | 151 |
| 14 | 162.6 |
| 15 | 174.2 |
| 16 | 185.8 |
| 17 | 197.4 |
| 18 | 209 |
| 19 | 220.6 |
| 20 | 232.2 |
| 21 | 243.8 |
| 22 | 255.4 |
| 23 | 267 |
| 24 | 278.8 |
| 25 | 290.4 |
| 26 | 302 |
| 27 | 313.6 |
| 28 | 325.2 |
| 29 | 336.8 |
| 30 | 348.4 |
| 31 | 360 |

METHOD AND APPARATUS IN A DATA PROCESSING SYSTEM FOR ACCELERATED BACK-FACE CULLING USING LOOK-UP TABLES

BACKGROUND OF THE INVENTION

1. Technical Field

The present invention relates generally to an improved data processing system and in particular to a method and apparatus for processing graphics data. Still more particularly, the present invention relates to a method and apparatus for back-face culling of data representing an object.

2. Description of Related Art

Data processing systems, such as personal computers and workstations, are commonly utilized to run computer-aided design (CAD) applications, computer-aided manufacturing (CAM) applications, and computer-aided software engineering (CASE) tools. Engineers, scientists, technicians, and others employ these applications daily. These applications involve complex calculations, such as finite element analysis, to model stress in structures. Other applications include chemical or molecular modeling applications. CAD/CAM/CASE applications are normally graphics intensive in terms of the information relayed to the user. Data processing system users may employ other graphics intensive applications, such as desktop publishing applications. Many of these applications may involve the display of three dimensional objects in which an object is rendered or drawn as it actually appears.

The visualization of surfaces is an important application of three-dimensional computer graphics. This technology offers accurate shaded images of surfaces along with the ability to quickly render new shaded images from any viewpoint.

Most three-dimensional computer graphics systems are optimized to render polygons, not surfaces. For this reason surfaces are usually approximated with polygons to enhance graphical performance. This creates a trade-off between the accuracy of a surface's image and the time required to produce it. For instance, a sphere may be approximated with a cube, which consists of only six polygons. The graphical performance on most three-dimensional computer graphics systems will be good in this case, but the accuracy to a sphere will be poor. As the number of polygons used in the approximation is increased the graphical performance suffers.

In many situations, one or more surfaces are used to represent the boundary of a solid. These surfaces each have a direction associated with them which identify the inside versus the outside of the solid. By approximating each surface with a mesh of polygons, surface directions may be substituted with polygonal directions, or normal vectors.

Normal vectors can be exploited during the rendering process to enhance graphical performance. By identifying whether a given normal vector points towards or away from the viewpoint, the corresponding polygon can be interpreted as being front-facing (visible) or back-facing (not visible). A technique called "back-face culling" allows improvements in graphical performance by identifying and rendering only those polygons that are front-facing.

Conventional back-face culling is typically performed using the vector dot product. Given two three-dimensional vectors: a polygon normal vector, N, and an "eye" vector, E, denoting the image plane normal vector pointing out of the screen, the dot product of these vectors determines the visibility of the polygon.

Let N and E be three-dimensional vectors ($n_i$, $n_j$, $n_k$) and ($e_i$, $e_j$, $e_k$), respectively. The vector dot product is defined as $DOT(N, E) = n_i * e_i + n_j * e_j + n_k * e_k$.

If the dot product is positive, then the polygon's front side is facing the image plane—the polygon is front-facing and should be rendered. If the dot product is negative, then the polygon's back side is facing the image plane—the polygon is back-facing and should not be rendered. If the dot product is zero, then the polygon is perpendicular to the image plane—the polygon is neither front nor back-facing and may or may not be rendered.

Although conventional back-face culling is a useful technique for improving graphical performance, it still requires three multiplications and two additions to be performed for each polygon. Therefore, it would be advantageous to have an improved method and apparatus for performing back-face culling without requiring as many operations to be performed for each polygon.

SUMMARY OF THE INVENTION

The present invention provides a method and apparatus in a data processing system for generating a two dimensional display of a three dimensional object. Data is received representing the three dimensional object. Back-face culling is performed using a data structure, wherein the data structure includes a set of predetermined visibility data derived from the results of dot products of normal vectors with eye vectors. The two dimensional display of the three dimensional object is generated using results of the back-face culling.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIGS. 5 and 6 are tables used to identify an index value for an angle $\phi$ and an index value for an angle $\theta$ in accordance with a preferred embodiment of the present invention.

DETAILED DESCRIPTION OF THE PREFERRED EMBODIMENT

Figure 1:
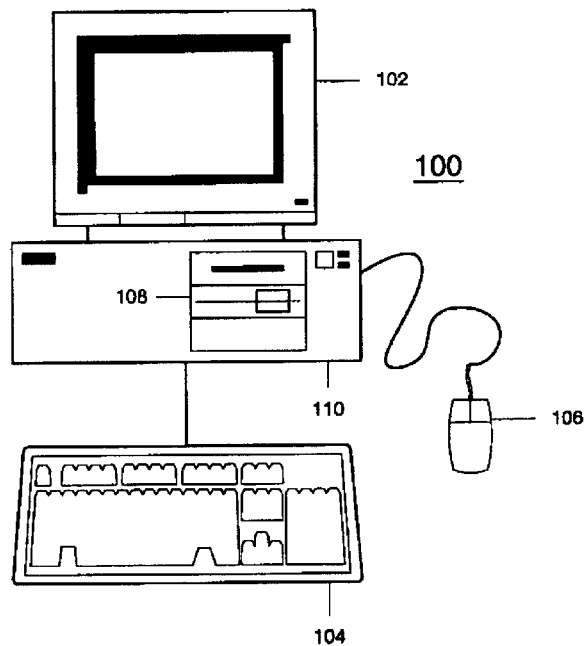
FIG. 1 is a pictorial representation of a data processing system in which the present invention may be implemented in accordance with a preferred embodiment of the present invention.

With reference now to the figures and in particular with reference to FIG. 1, a pictorial representation of a data processing system in which the present invention may be implemented is depicted in accordance with a preferred embodiment of the present invention. A computer 100 is depicted, which includes a system unit 110, a video display terminal 102, a keyboard 104, storage devices 108, which may include floppy drives and other types of permanent and removable storage media, and mouse 106. Additional input devices may be included with personal computer 100, such as, for example, a joystick, touchpad, touch screen, trackball, microphone, and the like. Computer 100 can be implemented using any suitable computer, such as an IBM RS/6000 computer or IntelliStation computer, which are products of International Business Machines Corporation, located in Armonk, N.Y. Although the depicted representation shows a computer, other embodiments of the present invention may be implemented in other types of data processing systems, such as a network computer. Computer 100 also preferably includes a graphical user interface that may be implemented by means of software residing in computer readable media in operation within computer 100.

Figure 2:
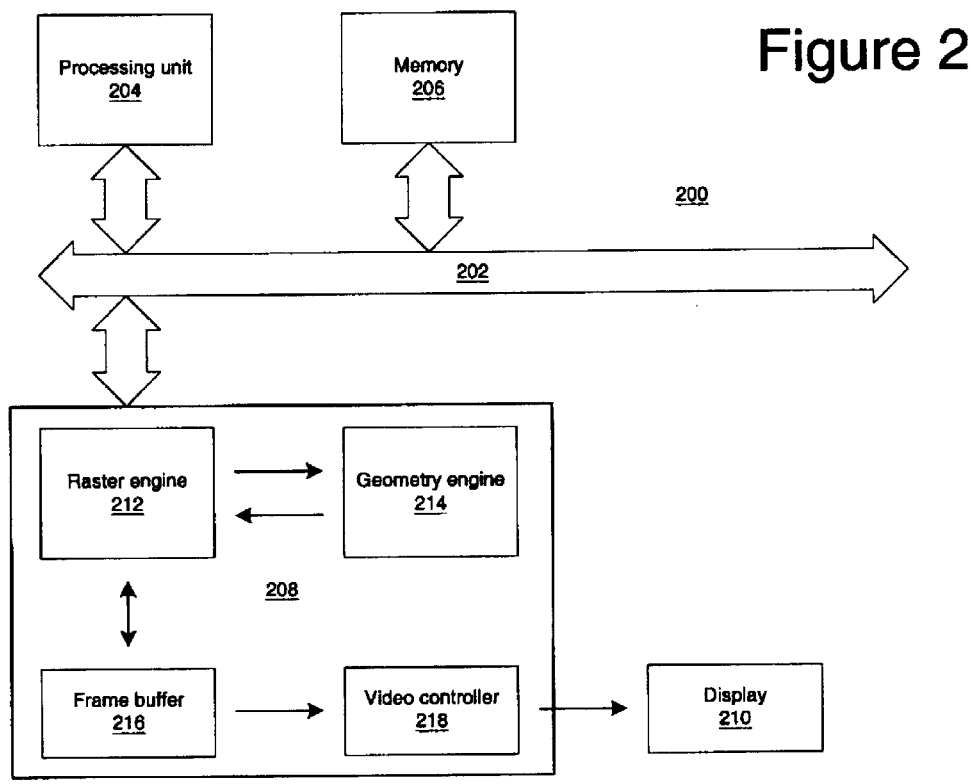
FIG. 2 is a block diagram of a data processing system in accordance with a preferred embodiment of the present invention.

Turning next to FIG. 2, a block diagram of a data processing system is depicted in accordance with a preferred embodiment of the present invention. Data processing system 200 is an example of components used in a data processing system, such as computer 100 in FIG. 1. Data processing system 200 employs a bus 202 in the form of a peripheral component interconnect (PCI) local bus architecture. Although the depicted example employs a PCI bus, other bus architectures, such as Accelerated Graphics Port (AGP) and Industry Standard Architecture (ISA), may be used. Processing unit 204, memory 206, and graphics adapter 208 are connected to bus 202 in these examples. Processing unit 204 includes one or more microprocessors in the depicted example.

Graphics adapter 208, in this example, processes graphics data for display on display device 210. The graphics data is received from applications executed by processing unit 204. Graphics adapter 208 includes a raster engine 212, a geometry engine 214, a frame buffer 216, and a video controller 218. Raster engine 212 receives the graphics data from the application. In these examples, raster engine 212 contains the hardware and/or software used to rasterize an image for display. Raster engine 212 is used to turn text and images into a matrix of pixels to form a bitmap for display on a screen. In the depicted example, raster engine 212 sends the received graphics data to geometry engine 214, which provides the functions for processing primitives and other graphics data to generate an image for raster engine 212 to process. The processed data is then passed back to raster engine 212. The mechanisms of the present invention are located in geometry engine 214 in these examples.

Frame buffer 216 is an area of memory used to hold a frame of data. Frame buffer 216 is typically used for screen display and is the size of the maximum image area on the screen. Frame buffer 216 forms a separate memory bank on graphics adapter 208 to hold a bitmap image while it is "painted" on a screen. Video controller 218 takes the data in frame buffer 216 and generates a display on display device 210. Typically, video controller 218 will cycle through frame buffer 216 one scan line at a time.

The present invention provides an improved mechanism for back-face culling using look-up tables. The mechanism described herein may be performed within a geometry engine, such as geometry engine 214 in graphics adapter 208 in FIG. 2. This mechanism simplifies the back-face culling operation by replacing the three multiplications and two additions performed for each polygon with a single memory access. By precomputing and storing the signs of dot products for a sampling of values of N and E, the processing time is shifted to minimize the impact of back-face culling on graphical performance.

Figure 3:
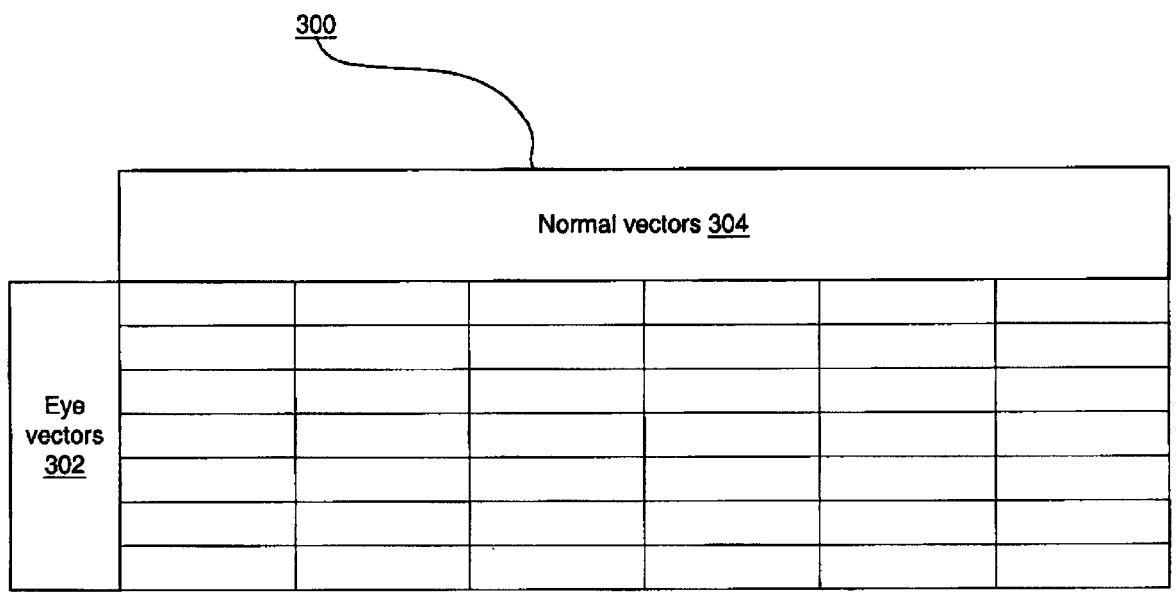
FIG. 3 is a diagram of a look-up table used for back-face culling in accordance with a preferred embodiment of the present invention.

With reference now to FIG. 3, a diagram of a look-up table used for back-face culling is depicted in accordance with a preferred embodiment of the present invention. Table 300 includes a set of entries in which the rows are indexed by eye vectors 302 and the columns are indexed by normal vectors 304. In these examples, each of these entries contain visibility data derived from the result of a dot product between a normal vector and an eye vector. More specifically, each of these entries contain an indication of whether a particular dot product is positive or negative, corresponding to front-facing or back-facing. In these examples, the size of table 300 is set to one megabyte of storage by allocating 1024 rows for eye vectors and 1024 columns for normal vectors, where each table entry contains one byte of data.

Figure 4:
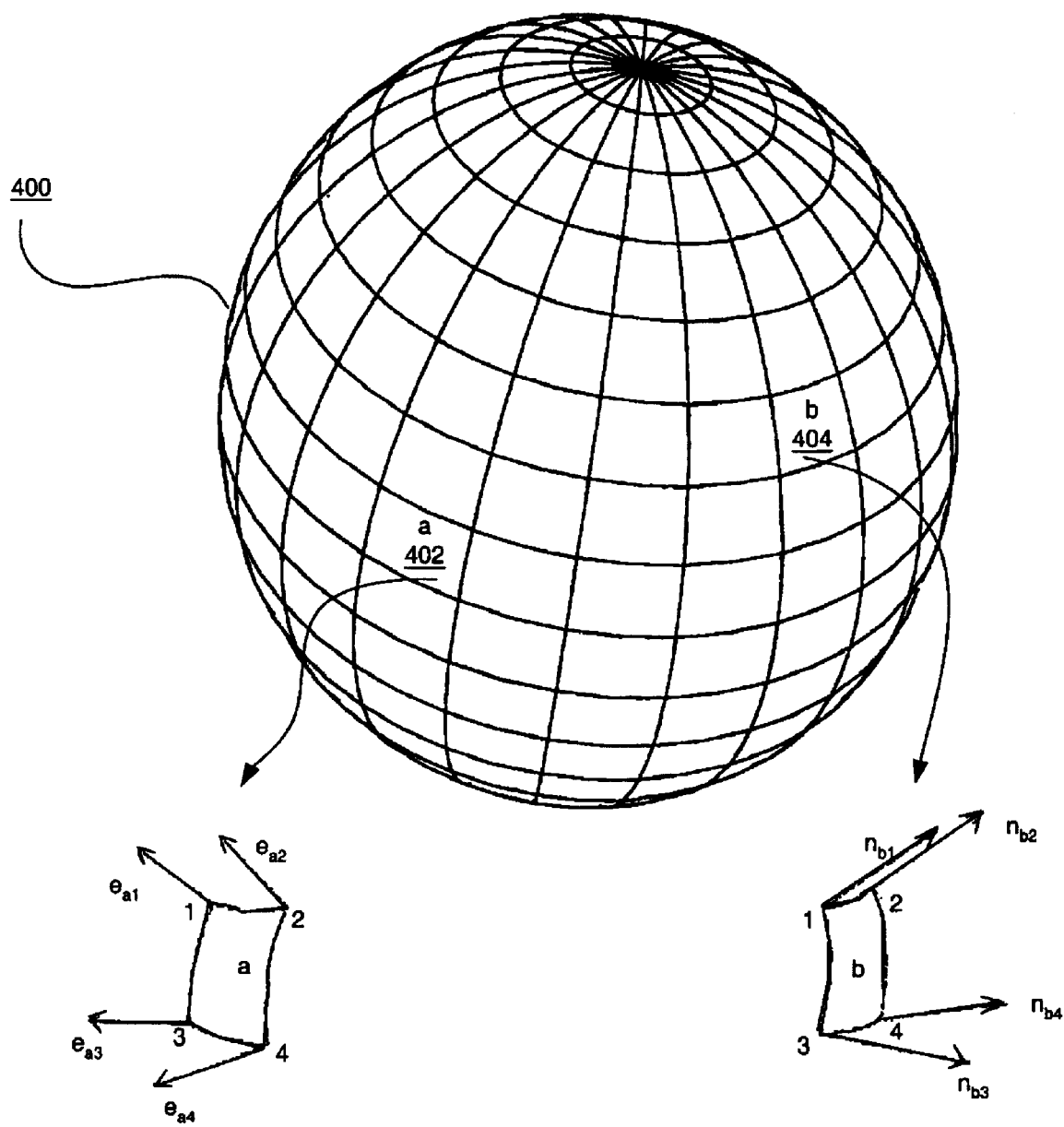
FIG. 4 is a diagram illustrating normal and eye vectors used in generating entries for a look-up table in accordance with a preferred embodiment of the present invention.

Turning next to FIG. 4, a diagram illustrating normal and eye vectors used in generating entries for a look-up table is depicted in accordance with a preferred embodiment of the present invention. In this example, sphere 400 includes a number of different sections or regions. Each of these regions may be used to represent a normal vector or an eye vector.

For example, region a 402 is associated with a table row corresponding to an eye vector in table 300 in FIG. 3. Region b 404 is associated with a column corresponding to a normal vector in table 300 in FIG. 3. In generating an entry in table 300 in FIG. 3, the minimum and maximum dot products of all combinations of $e_{ai}$ and $n_{bi}$, where i equal 1 to 4, are identified as MIN and MAX, respectively. Then, for a particular eye vector (E) and normal vector (N) if ((MIN<0)) and (MAX<0)) then the look-up table entries for T(a,b) and T(b,a) are set equal to back-facing. Otherwise, the look-up table entries for T(a,b) and T(b,a) are set equal to front-facing. Using this process, look-up table entries T(a,b) and T(b,a) in table 300 in FIG. 3 will contain a conservative estimate of the sign of the dot product for any vector in spherical region a 402 with any vector in spherical region b 404.

Turning back to FIG. 3, in creating table 300, Cartesian vectors (i,j,k) are converted into spherical coordinates ($\rho$, $\phi$, $\theta$). The coordinate $\rho$ measures radial length and is assumed to be positive. This particular coordinate is ignored because in back-face culling only vector directions are of interest. $\phi$ represents the spherical polar angle and corresponds to a measurement of latitude, where 0 degrees equals the north pole and 180 degrees equals the south pole. $\theta$ corresponds to a measurement of longitude, which can range from 0 to 360 degrees.

Each eye vector 302 and normal vector 304 can be represented with a ten bit value which encodes both $\phi$ and $\theta$ values. Using 5 bits for $\phi$, vectors may be represented with $0<=\phi<=180$ degrees at $2^5=32$ samples or approximately 5.63 degree intervals. Using 5 bits for $\theta$, vectors may be represented with $0<=\theta<=360$ degrees at $2^5=32$ samples or approximately 11.25 degree intervals. One 10 bit index n is used to represent N, and another 10 bit index e is used to represent E.

Turning now to FIGS. 5 and 6, tables used to identify an index value for an angle $\phi$ and an index value for an angle $\theta$ are depicted in accordance with a preferred embodiment of the present invention. Table 500 in FIG. 5 is used to identify an index value for an angle $\phi$ in degrees, while table 600 in FIG. 6 is used to identify an index value for an angle θ in degrees. Each of the index values is used as part of a ten bit index into a row or column in table 300 in FIG. 3. In these examples, five bits are allocated to φ. These five bits are the most significant five bits. The other five bits are allocated to θ in the least significant five bits of the ten bit value. For example, using tables 500 and 600, the value 521 is obtained as a result of the addition of index values 512+9, which corresponds to a vector with direction (φ,θ)=(92.9 degrees, 104.5 degrees). The value 521 is represented as a ten bit value for use as an index into table 300.

Because exact dot products are being approximated with look-up table entries, it is important to ensure that no negative (back-facing) entries are found when the dot product is positive (front-facing). This result would cause errors in the rendered image. Therefore, for each entry in table 300, the sign of DOT(N', E') is determined, where N' and E' represent the vectors lying within the same (φ,θ) intervals as N and E, respectively, such that the angle between N' and E' is minimized. The result of this approach is that all front-facing and some back-facing polygons are rendered, but most back-facing polygons are culled. The back-facing polygons that are rendered should not severely impact graphical performance because they will appear as thin slivers as a result of being nearly perpendicular to the image plane.

Figure 7:
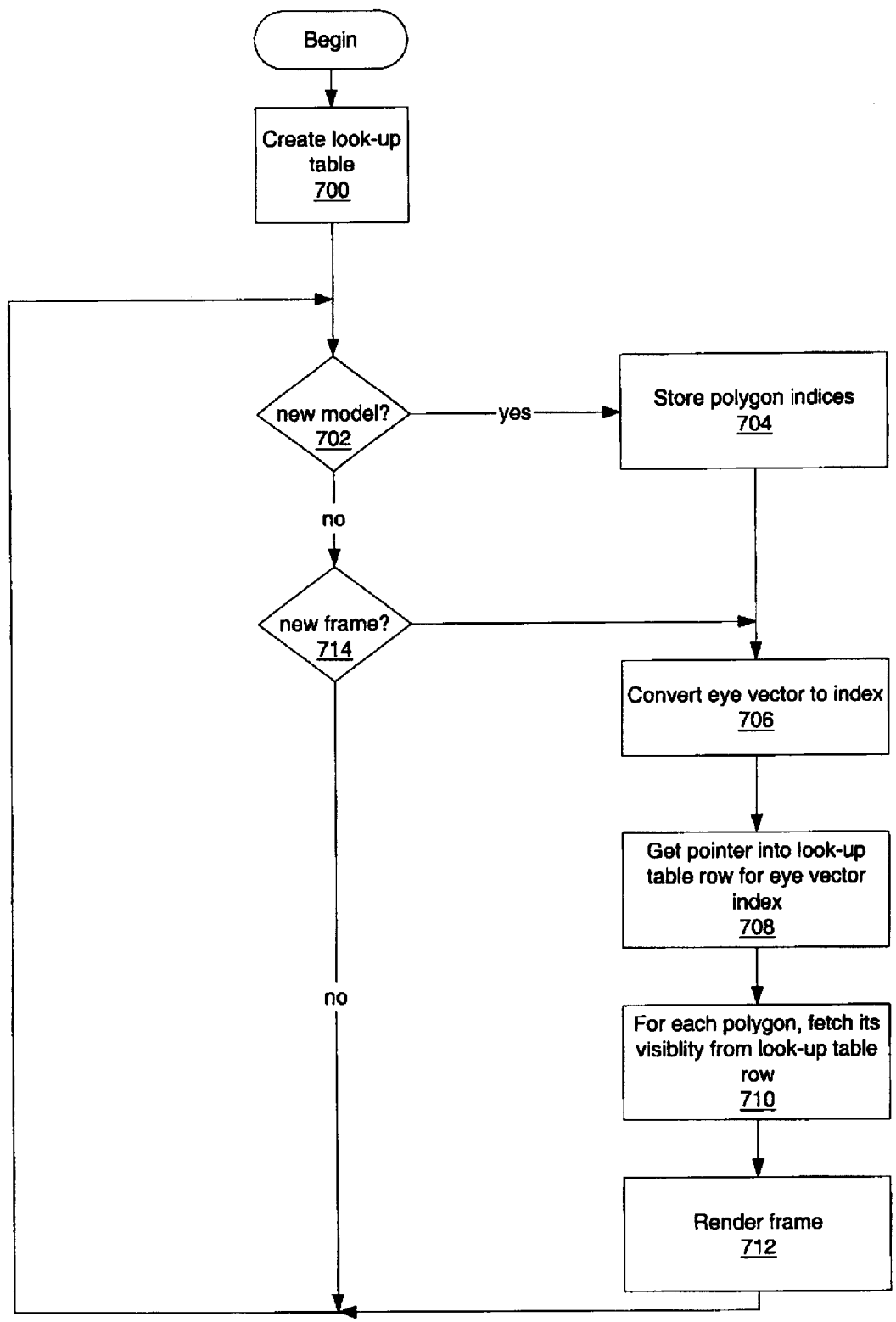
FIG. 7 is a flowchart of a process for accelerated back-face culling using look-up tables in accordance with a preferred embodiment of the present invention.

Turning next to FIG. 7, a flowchart of a process for accelerated back-face culling using look-up tables is depicted in accordance with a preferred embodiment of the present invention. The processes illustrated in FIG. 4 may be implemented in a data processing system, such as data processing system 200 in FIG. 2. In these examples, these processes may be performed in a graphics adapter, such as graphics adapter 208 in FIG. 2.

The process begins by creating a look-up table (step 700) which corresponds to a look-up table such as table 300 in FIG. 3 into which the visibility results of dot products are placed. A determination is made as to whether a new model has been loaded for display or rendering (step 702). For example, a new model may be an airplane wing, a wheel, or some other object. If a new model has been loaded, then indices are computed and stored for each of the polygons which represent the model's shape (step 704). Each index corresponds to a polygon normal vector and is stored as a ten bit value.

Next, the eye vector specific to the current frame is converted to a ten bit index value in the same fashion as the polygon normal vectors previously (step 706). For efficient array retrieval, a pointer into a row of the look-up table, such as table 300 in FIG. 3 is computed using the eye vector index (step 708). This simplifies a two dimensional memory access to a one dimensional memory access.

Then, front-facing polygons are identified by fetching visibility information from the look-up table row (step 710). This visibility information is an identification of whether a particular polygon: is front-facing or back-facing. The frame is then rendered for the object (step 712) with the process then returning to step 702 as described above.

With reference again to step 702, if a new model has not been loaded, then a determination is made as to whether a new frame is necessary (step 714). A new frame is necessary if a new or refreshed view of the object has been requested. In this case the process proceeds to step 706 as described above. Otherwise, the process returns to step 702.

Thus, the present invention provides an improved mechanism for back-face culling. Rather than computing dot products, an array element in a look-up table is accessed for each polygon. This advantage is achieved in part by generating a look-up table of visibilities for a sampling of all possible combinations of normal vectors and eye vectors. Conservative estimates of visibility are used in the depicted example. In this manner, dot product computations and comparisons are replaced with a single memory access.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. For example, although a 1024 by 1024 table is illustrated, other table sizes may be used depending on the memory availability and usage. Also, the examples illustrated the processes being implemented in a graphics adapter. Some or all of the processes also may be implemented in a host processor in a data processing system. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for generating a two dimensional display of a three dimensional object, the method comprising:

receiving data representing the three dimensional object;

performing back-face culling using a data structure, wherein the data structure includes a set of predetermined visibility data derived from the results of dot products of normal vectors with eye vectors, wherein the set of predetermined visibility data is generated prior to receiving the data representing the three dimensional object; and generating the two dimensional display of the three dimensional object using results of the back-face culling.

2. The method of claim 1 further comprising:

identifying signs of dot products of a set of normal vectors with a set of eye vectors; and storing the signs in the data structure, wherein spherical coordinates are used to encode the direction of a particular normal vector or a particular eye vector.

3. The method of claim 1, wherein the receiving and performing steps are performed by a host processor in the data processing system.

4. The method of claim 1, wherein the receiving and performing steps are performed in a graphics adapter in the data processing system.

5. The method of claim 1, wherein the data structure is a table.

6. The method of claim 1, wherein the object is comprised of a set of polygons and wherein a normal vector for a polygon in the set of polygons and an eye vector are used to identify an entry in the data structure.

7. The method of claim 1, wherein each visibility entry within the set of predetermined visibility data derived from the results of dot products of normal vectors with eye vectors includes an indication of one of a positive, negative, or zero result.

8. A method in a data processing system for identifying portions of a three dimensional object for display on a display device, the method comprising:
 generating a data structure containing visibility data derived from the results of dot products of a set of normal vectors with a set of eye vectors;
 receiving data representing the three dimensional object for rendering on the display device after generating the data structure, wherein the data comprises a set of polygons in which each polygon has a normal vector and;
 associating each polygon in the set of polygons with an index into the data structure to form a set of indices;
 associating an eye vector with a second index;
 identifying visible polygons in the set of polygons using the set of indices and the second index; and
 displaying the three dimensional object on the display device using the visible polygons.

9. The method of claim 8, wherein the data structure is a table.

10. The method of claim 9, wherein the table includes rows and columns in which the rows are indexed by an eye vector and the columns are indexed by a normal vector.

11. The method of claim 8, wherein the steps of receiving, associating each polygon, associating an eye vector, and identifying are performed in a host processor in the data processing system.

12. The method of claim 8, wherein the steps of receiving, associating each polygon, associating an eye vector, and identifying are performed in a graphics adapter in the data processing system.

13. A data processing system comprising:
 a bus system;
 a memory connected to the bus system;
 a processing unit connected to the bus system; and a graphics adapter connected to the bus system, wherein the graphics adapter includes an output configured for connection to a display device and receives data representing a three dimensional object for display on the display device, performs back-face culling using a data structure in which the data structure includes a set of predetermined visibility data derived from the results of dot products of normal vectors with eye vectors, wherein the set of predetermined visibility data is generated prior to receiving the data representing the three dimensional object, and generates data for a two dimensional display of the three dimensional object using results of the back-face culling.

14. The data processing system of claim 13, wherein the processing unit includes a single processor.

15. The data processing system of claim 13, wherein the processing unit includes a plurality of processors.

16. The data processing system of claim 13, wherein the bus system includes a primary bus and a secondary bus.

17. A data processing system for generating a two dimensional display of a three dimensional object, the data processing system comprising:
 receiving means for receiving data representing the three dimensional object;
 performing means for performing back-face culling using a data structure, wherein the data structure includes a set of predetermined visibility data derived from the results of dot products of normal vectors with eye vectors, wherein the set of predetermined visibility data is generated prior to receiving the data representing the three dimensional object; and
 generating means for generating the two dimensional display of the three dimensional object using results of the back-face culling.

18. The data processing system of claim 17 further comprising:
 identifying means for identifying signs of dot products of a set of normal vectors with a set of eye vectors; and
 storing means for storing the signs in the; data structure, wherein spherical coordinates are used to represent a particular normal vector and a particular eye vector.

19. The data processing system of claim 17, wherein the receiving means and performing means are located in a host processor in the data processing system.

20. The data processing system of claim 17, wherein the receiving means and performing means are located in a graphics adapter in the data processing system.

21. The data processing system of claim 17, wherein the data structure is a table.

22. The data processing system of claim 17, wherein the object is comprised of a set of polygons and wherein a normal vector for a polygon in the set of polygons and an eye vector are used to identify an entry in the data structure.

23. The data processing system of claim 17, wherein each visibility entry within the set of predetermined visibility data derived from the results of dot products of normal vectors with eye vectors includes an indication of one of a positive, negative, or zero result.

24. A data processing system for identifying portions of a three dimensional object for display on a display device, the data processing system comprising:
 generating means for generating a data structure containing visibility data derived from the results of dot products of a set of normal vectors with a set of eye vectors;
 receiving means for receiving data representing the three dimensional object for rendering on the display device after generating the data structure, wherein the data comprises a set of polygons in which each polygon has a normal vector and;
 first associating means for associating each polygon in the set of polygons with an index into the data structure to form a set of indices;
 second associating means for associating an eye vector with a second index;
 identifying means for identifying visible polygons in the set of polygons using the set of indices and the second index; and
 displaying means for displaying the three dimensional object using the visible polygons.

25. The data processing system of claim 24, wherein the data structure is a table.

26. The data processing system of claim 25, wherein the table includes rows and columns in which the rows are indexed by an eye vector and the columns are indexed by a normal vector.

27. The data processing system of claim 24, wherein the receiving means, first associating means, second associating means, and the identifying means are in a host processor in the data processing system.

28. The data processing system of claim 24, wherein the steps of receiving, associating each polygon, associating an eye vector, and identifying are performed in a graphics adapter in the data processing system.

29. A computer program product in a computer readable medium for use in a data processing system for generating a two dimensional display of a three dimensional object, the computer program product comprising:

first instructions for receiving data representing the three dimensional object;

second instructions for performing back-face culling using a data structure, wherein the data structure includes a set of predetermined visibility data derived from the results of dot products of normal vectors with eye vectors, wherein the set of predetermined visibility data is generated prior to receiving the data representing the three dimensional object; and third instructions for generating the two dimensional display of the three dimensional object using results of the back-face culling.

30. A computer program product in a computer readable medium for use in a data processing system for identifying portions of a three dimensional object for display on a display device, the computer program product comprising:

first instructions for generating a data structure containing visibility data derived from the results of dot products of a set of normal vectors with a set of eye vectors;

second instructions for receiving data representing the three dimensional object for rendering on the display device after generating the data structure, wherein the data comprises a set of polygons in which each polygon has a normal vector and;

third instructions for associating each polygon in the set of polygons with an index into the data structure to form a set of indices;

fourth instructions for associating an eye vector with a second index;

fifth instructions for identifying visible polygons in the set of polygons using the set of indices and the second index; and sixth instructions for displaying the three dimensional object using the visible polygons.

\* \* \* \* \*

UNITED STATES PATENT AND TRADEMARK OFFICE
CERTIFICATE OF CORRECTION

PATENT NO. : 6,507,341 B1
DATED : January 14, 2003
INVENTOR(S) : Gross et al.

It is certified that error appears in the above-identified patent and that said Letters Patent is hereby corrected as shown below:

Column 8,
Line 17, after "in the", delete ";".

Signed and Sealed this

Fifth Day of August, 2003

JAMES E. ROGAN
*Director of the United States Patent and Trademark Office*